United States Patent [19]

Gandhi et al.

[11] Patent Number: 5,577,794
[45] Date of Patent: Nov. 26, 1996

[54] PUSH-OUT TARGET VEHICLE SIDE DOOR

[75] Inventors: Umesh N. Gandhi, Grand Blanc; Mark E. Farmer, Waterford; Patricia L. Harmon, Rochester Hills; Douglas J. Osmak, Clarkston; Linda M. Kajma, Troy; Thomas J. Hansz, Rochester Hills, all of Mich.

[73] Assignee: General Motors Corporation, Detroit, Mich.

[21] Appl. No.: 353,761

[22] Filed: Dec. 12, 1994

[51] Int. Cl.$^6$ .................................................. B60J 5/04
[52] U.S. Cl. .................................. 296/146.6; 296/146.7; 280/750
[58] Field of Search ........................ 296/146.5–146.7, 296/188, 189; 280/750; 49/501, 502

[56] References Cited

U.S. PATENT DOCUMENTS

| | | | |
|---|---|---|---|
| 3,791,693 | 2/1974 | Hellriegel et al. | 49/503 |
| 3,868,796 | 3/1975 | Bush . | |
| 3,964,208 | 6/1976 | Renner et al. | 49/502 |
| 3,989,275 | 11/1976 | Finch et al. | 280/751 |
| 4,272,103 | 6/1981 | Schmid et al. | 280/751 |
| 4,369,608 | 1/1983 | Miura et al. | 52/309.9 |
| 4,769,951 | 9/1988 | Kaaden | 49/502 |
| 4,786,100 | 11/1988 | Kleemann et al. | 296/153 |
| 5,000,509 | 3/1991 | Sinnhuber et al. | 296/188 |
| 5,040,335 | 8/1991 | Grimes | 49/502 |
| 5,048,234 | 9/1991 | Lau et al. | 49/502 |
| 5,066,064 | 11/1991 | Garnweidner | 296/189 |
| 5,102,163 | 4/1992 | Ishikawa | 280/751 |
| 5,169,204 | 12/1992 | Kelman | 296/189 |
| 5,277,441 | 1/1994 | Sinnhuber . | |
| 5,306,066 | 4/1994 | Saathoff | 296/146.6 |
| 5,328,234 | 7/1994 | Daniel et al. | 297/216.16 |

FOREIGN PATENT DOCUMENTS

| | | | |
|---|---|---|---|
| 4228626 | 3/1994 | Germany . | |
| 4338249 | 5/1994 | Germany | 296/146.6 |
| 4362415 | 12/1992 | Japan | 296/189 |
| 6270681 | 9/1994 | Japan | 296/146.7 |
| 1441598 | 7/1976 | United Kingdom | 280/751 |
| 2271534 | 4/1994 | United Kingdom . | |

*Primary Examiner*—Dennis H. Pedder
*Attorney, Agent, or Firm*—Ernest E. Helms

[57] ABSTRACT

An automotive vehicle door structure is provided which, in a preferred embodiment, includes a first generally rigid outer structure, a second generally rigid inner structure spaced from the outer structure and having an opening generally aligned with the pelvic region of a vehicle occupant seated inside the vehicle, a bracket spanning the opening of the inner structure, and a compliant target held by the bracket spaced generally adjacent the inner structure opening and located between the inner and outer structures. Thus, an impact on the door causes the target to protrude inwardly through the inner structure opening.

3 Claims, 3 Drawing Sheets

5,577,794

PUSH-OUT TARGET VEHICLE SIDE DOOR

FIELD OF THE INVENTION

The field of the present invention is that of apparatuses and methods of utilization thereof of vehicle side doors.

BACKGROUND OF THE INVENTION

Beyond the utilization of side impact beams, there have been various other approaches utilized to aid in the mitigation of possible injury of vehicle occupants in side impacts. One method is to increase the padding material inside the vehicle. Interior padding on the vehicle door is limited since increasing the interior padding on the door also diminishes the interior space available within the vehicle.

Another method is to provide a honeycomb structure between inner and outer panels of the vehicle. This structure is disadvantageous because it greatly adds complexity to manufacturing, often requiring many more welds. Additionally, such structures can substantially increase the weight of the door. The weight of the door works to diminish the environment efficiency of the vehicle.

Another technique to protect the vehicle occupant is to add an energy absorbing material between the inner and outer door structures. This technique is limited by the amount of space between the inner and outer panels, and it is often not sufficient to place the amount of energy absorbing material as desired. Also, if the energy-absorbing material placement arrangement between the inner and outer door structures is incorrectly designed, the arrangement may even further contribute to increased injury to the vehicle occupant.

It is desirable to improve upon the three above-mentioned techniques of passenger protection while at the same time minimizing vehicle weight and manufacturing complexity.

SUMMARY OF THE INVENTION

The present invention provides an alternative to the three above-mentioned techniques by providing a vehicle door with rigid inner and outer panel structures. The inner panel structure has an opening. Suspended between the inner and outer panels adjacent to the opening in the inner panel, in a preferred embodiment, is a compliant target. Upon a side impact of the vehicle door, the target will protrude through the opening in the inner panel, ideally contacting a seated vehicle occupant in the pelvic region (via a more compliant door trim panel), thereby directing the initial impact to the vehicle occupant in the portion of the body most capable of sustaining the impact without serious injury and thereafter causing the vehicle occupant to be further away from the door as the door crumbles because of the side impact on the vehicle.

These and other advantages of the present invention will be more apparent to those skilled in the art as the present invention is revealed in greater detail in the accompanying drawings and the following description.

DESCRIPTION OF THE PREFERRED EMBODIMENT

Figure 1:
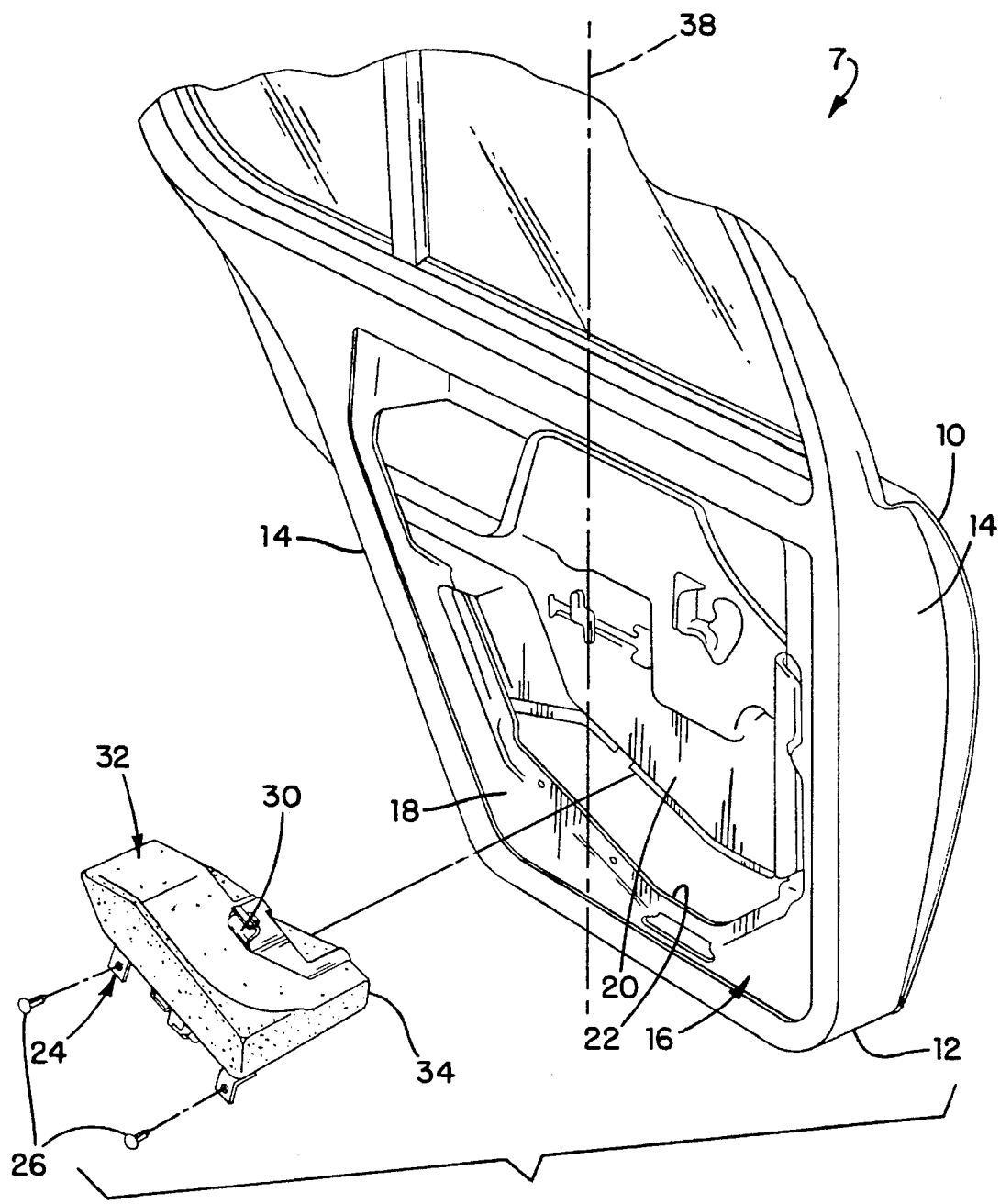
FIG. 1 is an exploded perspective view of a left-hand rear door according to the present invention with an inner trim panel and portions of the door hardware removed for clarity of illustration.
Figure 2:
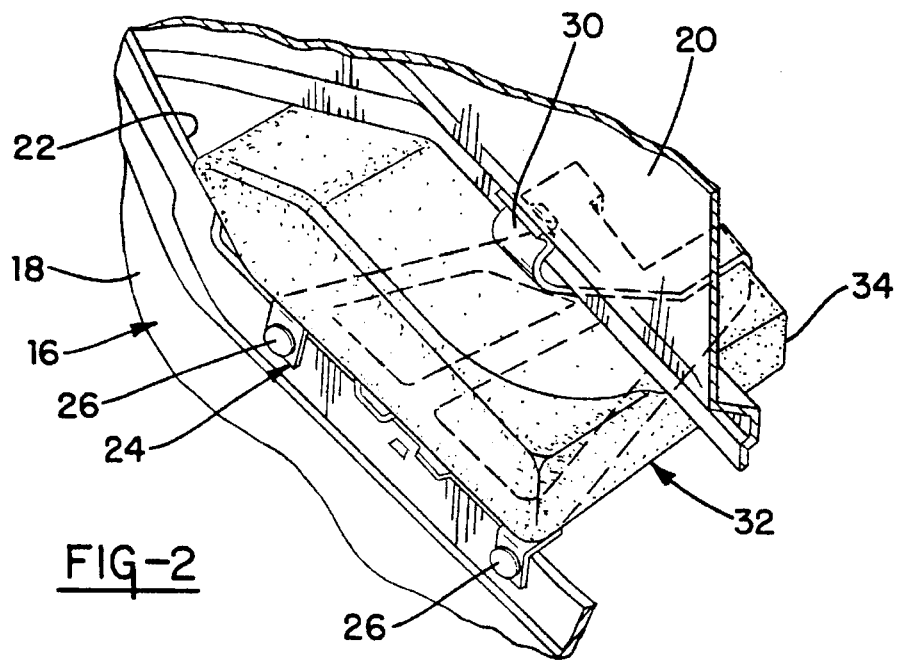
FIG. 2 is a cut-away, enlarged view of the door shown in FIG. 1 with a target held in a bracket in an opening of a door inner structural panel.
Figure 3:
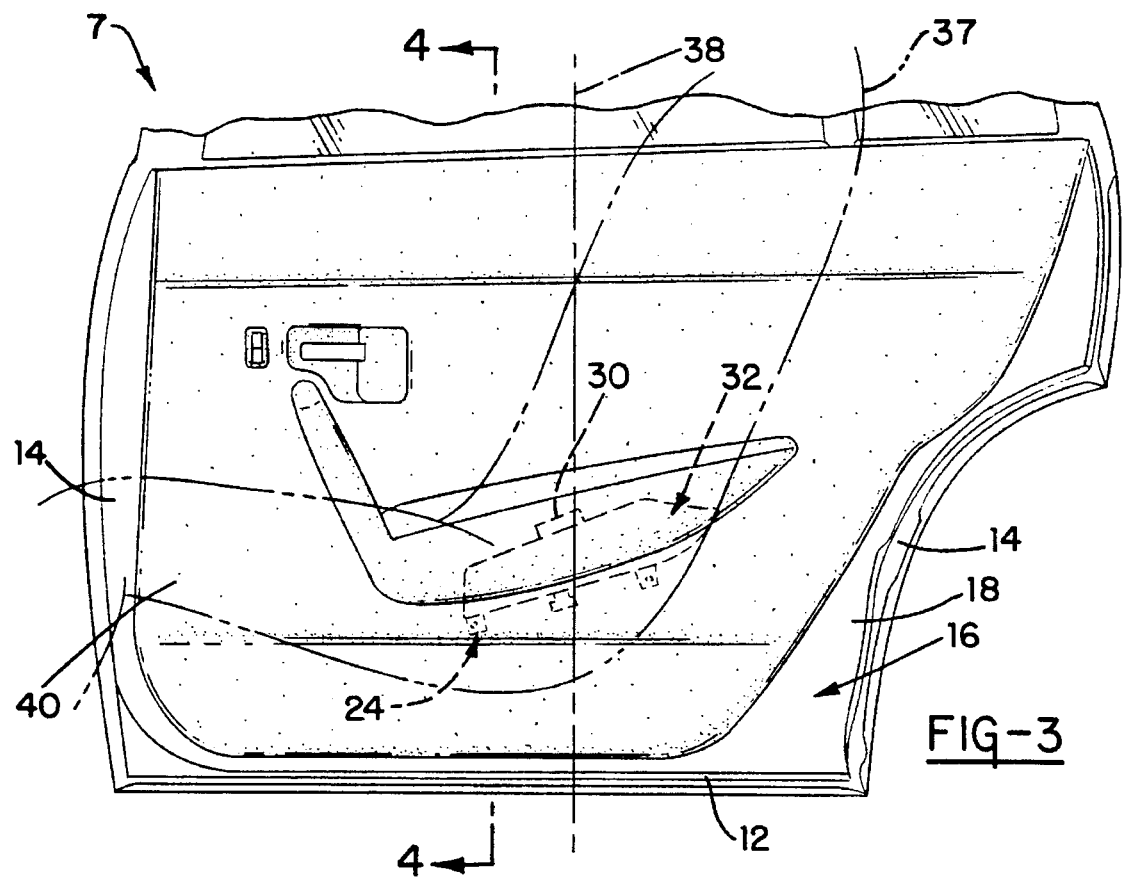
FIG. 3 is a side elevational view of a right-hand vehicle door according to the present invention.
Figure 4:
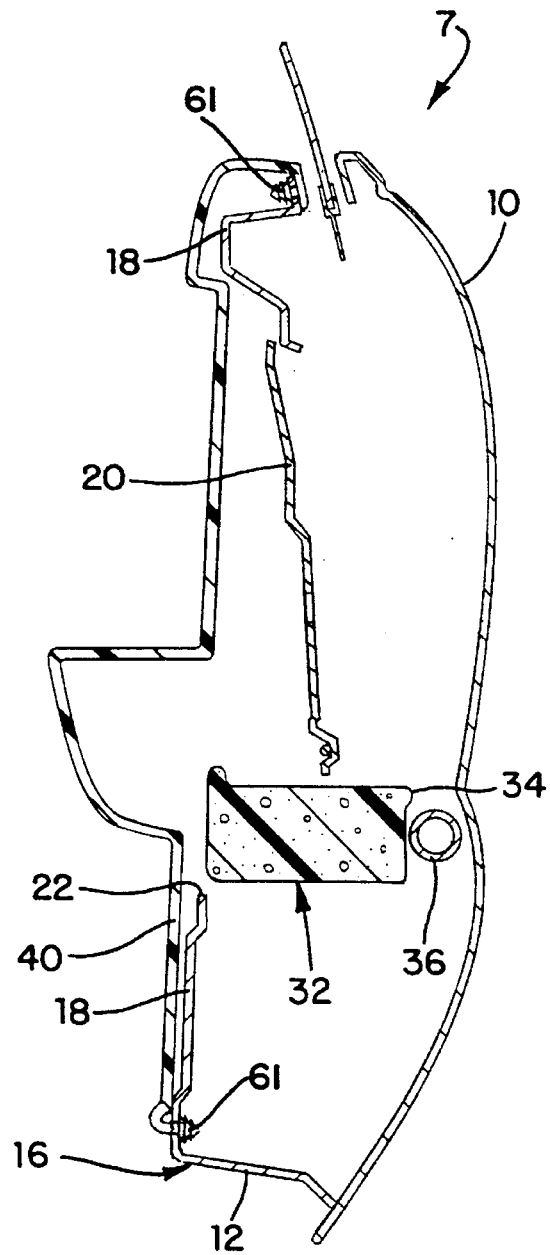
FIG. 4 is a view corresponding to line 4—4 of FIG. 3.
Figure 5:
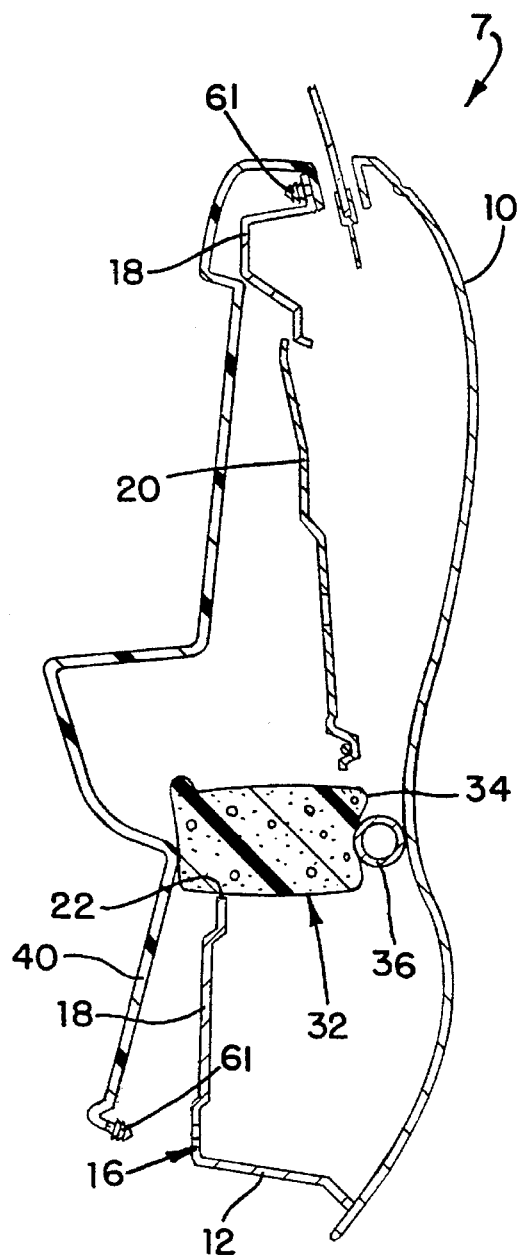
FIG. 5 is a view similar to that of FIG. 4 illustrating deformation of the door due to a side impact.

The doors in FIGS. 1 and 3 are identical except for left or right orientation. Thus, identical reference numerals are utilized.

Referring to FIGS. 1 through 5, the door 7 has a typical steel outer door panel 10. Joined to the outer door panel 10 by a floor 12 and side panels 14 is an inner panel 16. Typically, the floor 12, side panels 14 and inner panel 16 will be fabricated from a common stamping, sometimes referred to in the industry as the "door inner". The inner panel 16 is spaced from the outer panel 10. The inner panel 16 is principally comprised of two members, an outer peripheral member 18 and a module hardware member 20. Between the module hardware member 20 and the lower portion of the outer peripheral member 18, there exists an opening 22. Mounted within opening 22 is a plastic bracket 24. The bracket 24 is attached by Christmas tree-type push-in fasteners 26 to the lower outer periphery inner panel 18 and has a snap-in type connection 30 with the door hardware module 20.

Mounted within the bracket 24 is a target 32. Target 32 is preferably spaced to be near the pelvic region of an occupant 37 seated in the vehicle and has an end 34 which can optionally be placed adjacent a vehicle side beam 36, which spans the length of the vehicle door 7. The target 32 is fabricated from expanded polypropylene (EPP) foam of a density of 2.8 lb/cu ft or similar material. The target 32 should experience approximately 60 mm of crush below 5000N but above 4000N. The longitudinal placement of the target 32 should be in a position approximating a predicted bending axis 38 of the door in a side impact situation.

In a side collision at approximately 33.5 miles per hour, the vehicle door 7 deforms inboard, and the whole vehicle starts to move away from a contacting vehicle. A seated occupant (not shown) is not rigidly attached to the vehicle and hence remains stationary during the first few milliseconds. The severity with which the door 7 contacts the occupant is the major criteria determining possible injury. The interaction between the door interior and the occupant continues until the struck vehicle and the occupant are traveling at the same velocity, i.e., final velocity of the struck vehicle after impact.

Some of the kinetic energy of the contacting vehicle is expended in deforming the vehicle structure and moving the vehicle on which the door 7 is mounted. The struck vehicle will move at a velocity of approximately 20 to 25 mph. Applying the laws of the conservation of momentum and conservation of energy, it is estimated that only 60 to 70 percent of the total energy from striking vehicle (i.e., about 100 KNm out of 150 KNm) is dissipated in the deformation of the vehicles. After the impact, the kinetic energy of the occupant is about two percent (3 to 4 KNm out of 150 KNm).

During the side collision, the target 32 will protrude through the opening 22, dislodging an interior trim (typically plastic or fiberglass) inner panel 40. Although conventional fasteners such as plastic Christmas trees 61 may be used to attach the trim panel 40 to the inner panel 16, it is important that at least the trim panel 40 bottom edge be allowed to separate from the inner panel 16 at approximately a 1500N load.

Ideally, the first contact with the vehicle seat occupant should be in an area adjacent the occupant's pelvic region by the trim panel 40. As the target 32 pushes the trim panel 40 inboard, the occupant is loaded near the lower part of the pelvic area. This helps to avoid occupant injury because an occupant's pelvic area can withstand higher load than an occupant's torso and it also moves the occupant's torso away from the trim. Therefore, early loading of the pelvis helps in lowering the injury to the torso and other parts of the occupant while improved compliance near the pelvis helps reduce any chance of pelvic injury.

As mentioned previously, the energy going into the occupant is only about two percent of the total kinetic energy from the impacting vehicle (i.e., 150 kNm). The energy absorbed by the target 32 is quite insignificant (approximately 0.1 kNm) compared to the total energy of the impacting vehicle. Therefore, the energy absorbed by the target 32 is not important. The important role of the target 32 is in pushing the pelvis and limiting the force transferred from the car interior to the pelvis. Based on studies at Wayne State University (SAE paper 933128) and other empirical data, it has been found that the lower part of the pelvis can withstand loading up to 5 kNm without serious injury. Therefore, the target 32 is designed to crush below 5 kN force.

Since the target 32 contacts the pelvic area via the trim panel 40, there is a degree of design freedom in the exact location of the target 32.

The present invention has significantly lowered G forces experienced in the pelvic region as compared to conventional designs without a target. G force reductions realized have typically exceeded 16 percent, with reductions of 33 percent or more being realized on some vehicle door designs.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An automotive vehicle door structure comprising:
   a first generally rigid outer structure;
   a second generally rigid inner structure spaced from the outer structure, the inner structure having an opening located laterally of a pelvic region of a seated vehicle occupant;
   an impact beam generally spanning lengthwise of the door structure;
   a compliant target spaced generally adjacent the inner structure opening and located between the inner and outer structures horizontally aligned with the impact beam, the target being sized to have unobstructed passage through the opening in the second rigid inner structure, whereupon an impact on the outer door panel door causes the target to protrude inwardly through the inner structure opening; and
   a bracket which holds the target in the opening in the second right inner structure.

2. A door structure as described in claim 1 with an interior door trim panel connected to the second rigid inner structure, and upon protrusion of the target, the interior trim panel is separated from the second rigid inner door structure along the interior trim panel lower edge.

3. An automotive vehicle door structure comprising:
   a first generally rigid outer structure;
   a second generally rigid inner structure spaced from the outer structure, the inner structure having an opening generally aligned with the pelvic region of a vehicle occupant seated inside the vehicle;
   a bracket vertically spanning the opening of the inner structure;
   an interior door trim panel connected to the second rigid inner structure; and
   a compliant target held by the bracket spaced generally adjacent the inner structure opening the target being sized and held to have unobstructed passage through the opening in the second rigid inner structure and located between the inner and outer rigid structures, whereupon an impact on the door causes the target to protrude inwardly through the inner structure opening and separate the interior door panel from the second inner rigid structure along the interior door panel lower edge.

* * * * *